(12) United States Patent
Dalzell et al.

(10) Patent No.: US 8,296,828 B2
(45) Date of Patent: Oct. 23, 2012

(54) TRANSFORMING CLAIM BASED IDENTITIES TO CREDENTIAL BASED IDENTITIES

(75) Inventors: Javier Dalzell, Issaquah, WA (US); Saji Varkey, Redmond, WA (US); Kaushik Raj, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 457 days.

(21) Appl. No.: 12/335,995

(22) Filed: Dec. 16, 2008

(65) Prior Publication Data
US 2010/0154041 A1     Jun. 17, 2010

(51) Int. Cl.
*G06F 21/00* (2006.01)
(52) U.S. Cl. ............. 726/6; 713/185; 713/200; 713/168
(58) Field of Classification Search ...... 726/6; 713/168, 713/200
See application file for complete search history.

(56) References Cited

U.S. PATENT DOCUMENTS

| | | | | |
|---|---|---|---|---|
| 2002/0184521 | A1* | 12/2002 | Lucovsky et al. | 713/200 |
| 2003/0065940 | A1* | 4/2003 | Brezak et al. | 713/201 |
| 2005/0097350 | A1* | 5/2005 | Patrick et al. | 713/200 |
| 2006/0080352 | A1 | 4/2006 | Boubez et al. | |
| 2006/0123472 | A1 | 6/2006 | Schmidt et al. | |
| 2006/0136990 | A1 | 6/2006 | Hinton et al. | |
| 2007/0186106 | A1* | 8/2007 | Ting et al. | 713/168 |
| 2007/0204168 | A1* | 8/2007 | Cameron et al. | 713/185 |
| 2007/0204325 | A1 | 8/2007 | Cameron et al. | |
| 2007/0255841 | A1 | 11/2007 | Chong | |
| 2007/0255958 | A1 | 11/2007 | Schmidt et al. | |
| 2008/0184339 | A1 | 7/2008 | Shewchuk et al. | |

OTHER PUBLICATIONS

De Clercq, Jan; "Single Sign-On Architectures", Lecture Notes in Computer Science, Jan. 1, 2002, pp. 40-58, ISBN 978-3-540-44309-4, vol. 2437.*
Sack, Joseph; "Encryption," SQL Server 2008 Transact-SQL Recipes, Tuesday, Sep. 2, 2008, Publisher: Apress, ISBN: 978-1-4302-0625-5, pp. 547-578.*
"SAML Tokens and Claims", Retrieved at <<http://msdn.microsoft.com/en-us/library/ms733083(printer).aspx>>, Oct. 10, 2008, pp. 1-2.
Brown, Keith, "Security Briefs: Exploring Claims-Based Identity", Retrieved at <<http://msdn.microsoft.com/en-us/magazine/cc163366.aspx>>, Oct. 10, 2008, pp. 1-6.
Bustamante, Michele Leroux, "Fundamentals of WCF Security", Retrieved at <<http://www.devx.com/codemag/Article/33342/1954?pf=true>>, Oct. 10, 2008, pp. 1-13.
"Some Application Security Terminology", Retrieved at <<http://geekswithblogs.net/MainaD/archive/2008/04/03/120994.aspx>>, Oct. 10, 2008, pp. 1-6.

* cited by examiner

*Primary Examiner* — Carl Colin
*Assistant Examiner* — S. Ali Zaidi
(74) *Attorney, Agent, or Firm* — Turk IP Law, LLC

(57) ABSTRACT

Claim based identities are transformed to a set of credentials and securely stored in a secure data store using a number of encryption schemes. The credentials are then used to authenticate applications requiring specific credential types. For each call to the secure store system, a client application may provide a claims token issued by a trusted source, which is used to search for corresponding credentials in the secure data store if the credentials have been created previously for the user.

18 Claims, 8 Drawing Sheets

TRANSFORMING CLAIM BASED IDENTITIES TO CREDENTIAL BASED IDENTITIES

BACKGROUND

Many enterprise applications use custom credentials such as a user name and password or leverage some other credentials mechanism for security purposes. When interoperation with external applications is needed, a user may be required to enter the credentials for the external application(s). This creates challenges for security (like users keeping their passwords in unsafe locations) and system management.

Users not having to remember multiple credentials—especially with hard to remember strong passwords—is preferred both by users and system administrators. One solution that has been tried is Single Sign On (SSO) approach, which attempts to mitigate the credential challenge by storing the credentials mapped to a particular user. However, these technologies have hard dependencies in the underlying authentication mechanism.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to transforming claim based identities to a set of credentials, which may then be used to authenticate applications requiring specific credential types. According to some embodiments, the transformation may be performed by presenting the claim based identity via a token. According to other embodiments, a plurality of credentials may be generated based on a claim based identity and securely stored.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
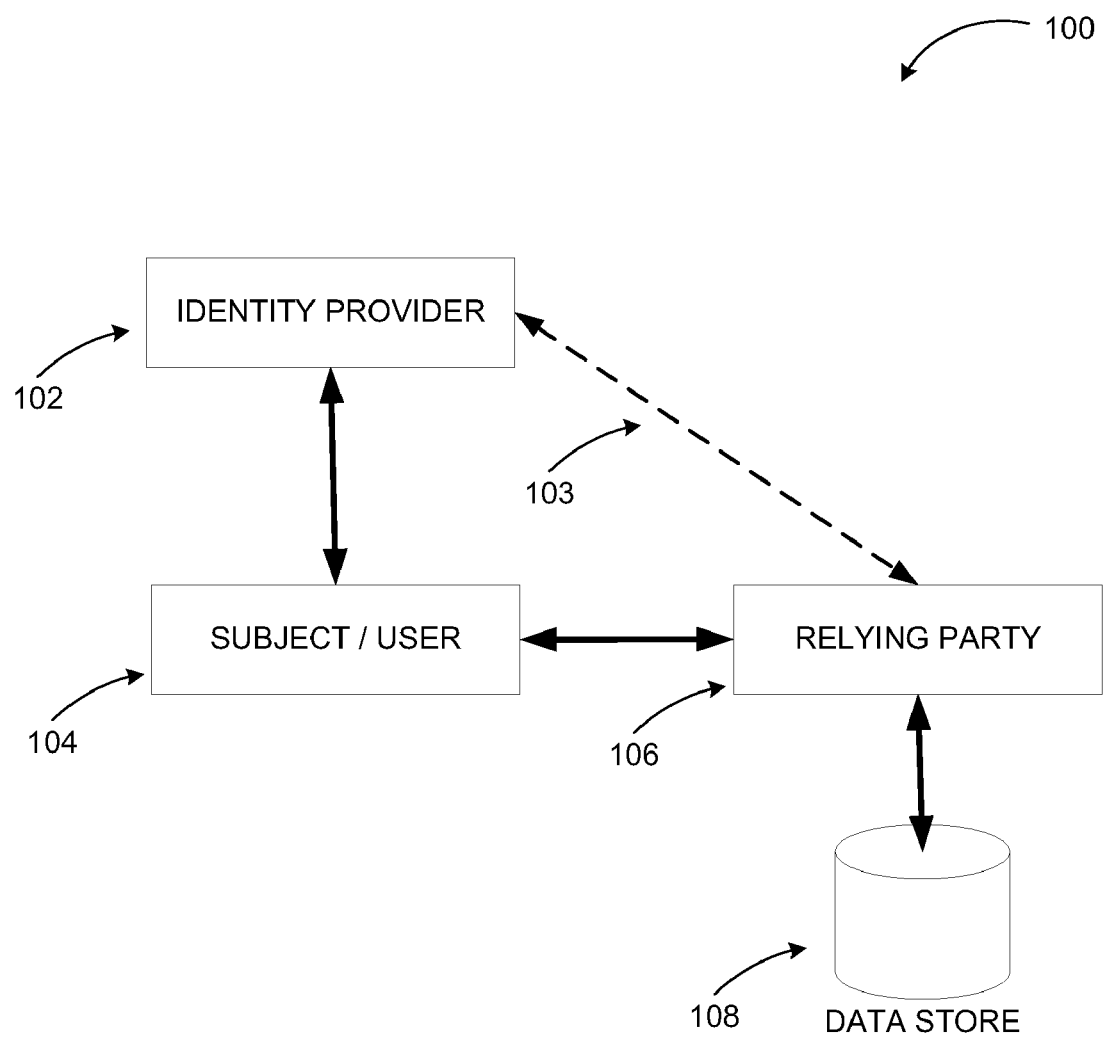
FIG. 1 illustrates an example architecture, where an identity transformation according to embodiments may be implemented.

As briefly described above, claim based identities may be transformed into credential based identities employing a token. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for flattening multi-dimensional data. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates an example architecture, where an identity transformation according to embodiments may be implemented. In a system according to embodiments, users employing different claims based authentication technologies can interact with systems that do not necessarily understand the user's authentication type. A service may provide the functionality found on existing authentication systems such as SSO, but without the dependencies on the underlying authentication technology. In order to accomplish this, the system according to one embodiment transforms a claim based identity presented via a security token such as a Security Assertions Markup language (SAML) token, into a set of credentials. Then these credentials may be used to authenticate the user in applications that require a specific type of credentials, even custom credentials. The capabilities may be provided with a high level of security and enable advanced scenarios to prevent the disclosure of such sensitive information.

Furthermore, administrators may enter credentials on behalf of users in a system according to embodiments. Thus, administrators do not have to reveal the credentials to end users, still enabling them to connect to an external application. Administrators may also bulk-load credentials, making it easier to manage systems with large number of subscribers.

In system 100, relying party 106 may authorize user/subject 104 by verifying claims provided by user/subject 104. Relying party 106 receives the claims from a trusted source such as identity provider 102 and uses them to authorize resources managed by the relying party. The interactions may include issuance of a claims token by identity provider 102 in response to a request by the subject/user 104, forwarding of the token to relying party 106 and authorization of resources by relying party 106. The token issuance by the identity provider 102 may be performed by a framework transparent to the user and the trust (103) between the relying party 106 and identity provider 102 may be established as specified by the claims specification. Data store 108 may be utilized to store information associated with the resources managed by relying party 106.

Figure 2:
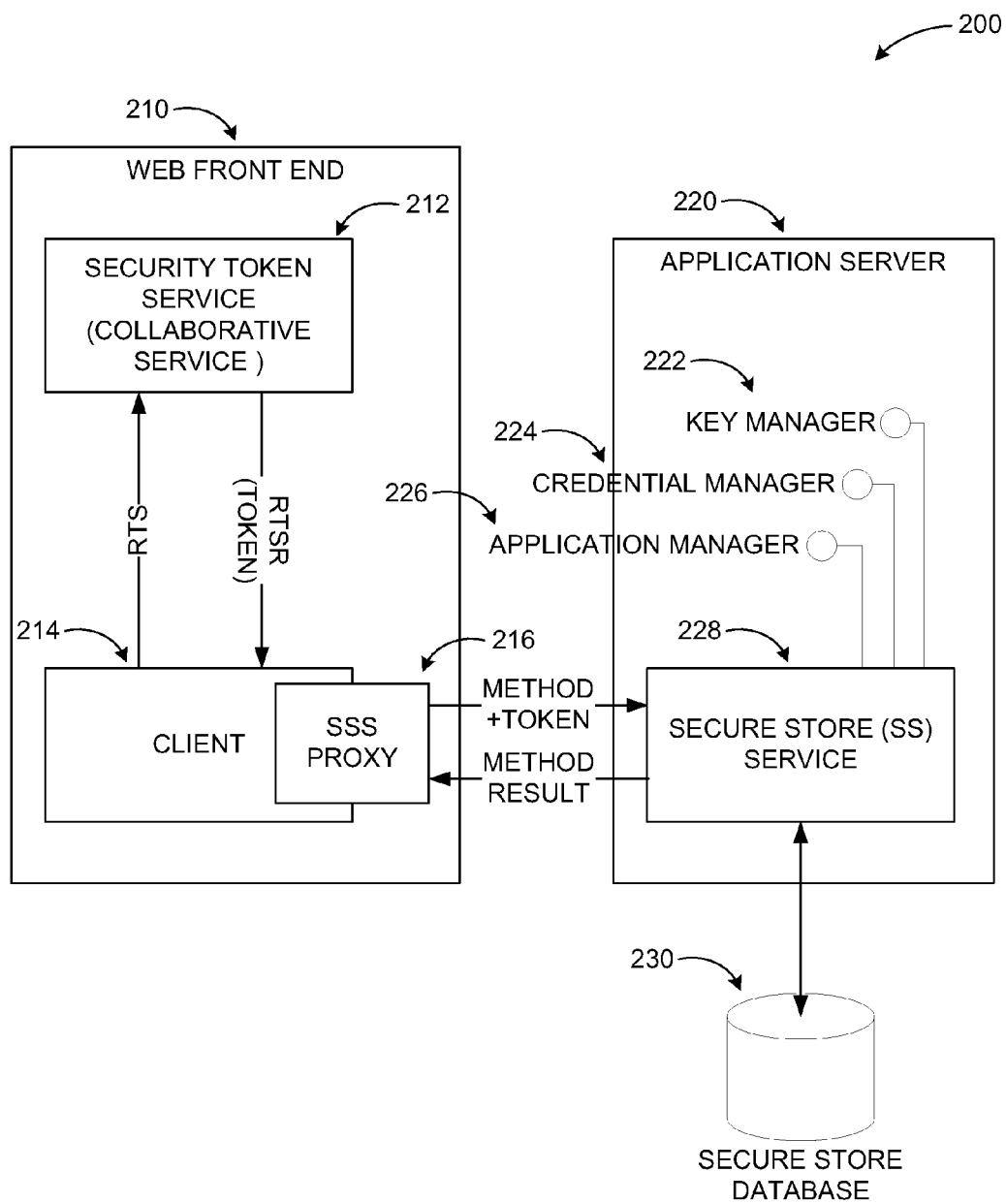
FIG. 2 illustrates a diagram of major components of an example web based system where embodiments may be implemented.

FIG. 2 illustrates a diagram 200 of major components of an example web based system where embodiments may be implemented. Secure Store Service (SSS) 228 is the equivalent of relying party in system 100 of FIG. 1. SSS 228 may be executed on an application server 220 and manage resources associated with a one or more services upon request from a user through client 214.

Credentials stored in secure store database 230 may be kept encrypted. Credential encryption/decryption may happen on the application server 220. A master key may be used to encrypt the stored credentials managed by key manager 222. Key management feature of SSS 228 may generate the master key after SSS provision, synchronize the master key to a new service instance, synchronize the master key to service instances when managed accounts change, modify a master secret key, back up or restore the secure store database, or provide the master key to a secure service object model for encryption/decryption.

As discussed previously, claim based identities are transformed to credential based identities according to one embodiment. Upon receiving an indication from a user for accessing a resource managed by SSS 228, client 214 may send a request security token (RTS) to a collaborative service 212 such as security token service (STS). STS 212 returns a token with a request security token response (RSTR). Both the client 214 and the STS 212 may be part of a web front end 210 in a web based hosted service.

A secure store service (SSS) proxy module 216 with client 214 may then provide the token, which may be a SAML token to SSS 228 along with a request for a resource. In addition to the key manager 222, SSS 228 may include application manager interface 226, which may declare an application management API for allowing users and administrators to create, read, and/or delete applications. Some of the application management methods may require administrative privilege. Thus, access verifications through the credentials may be performed before accessing each public method. A credential management API declared through credential manager interface 224 may be used to get and to set credentials for an application. Ticketing, which is used in cases where a component submitting the actual request does not have a direct access to the credentials of the user, may be supported and managed through credential manager interface 224.

Figure 3:
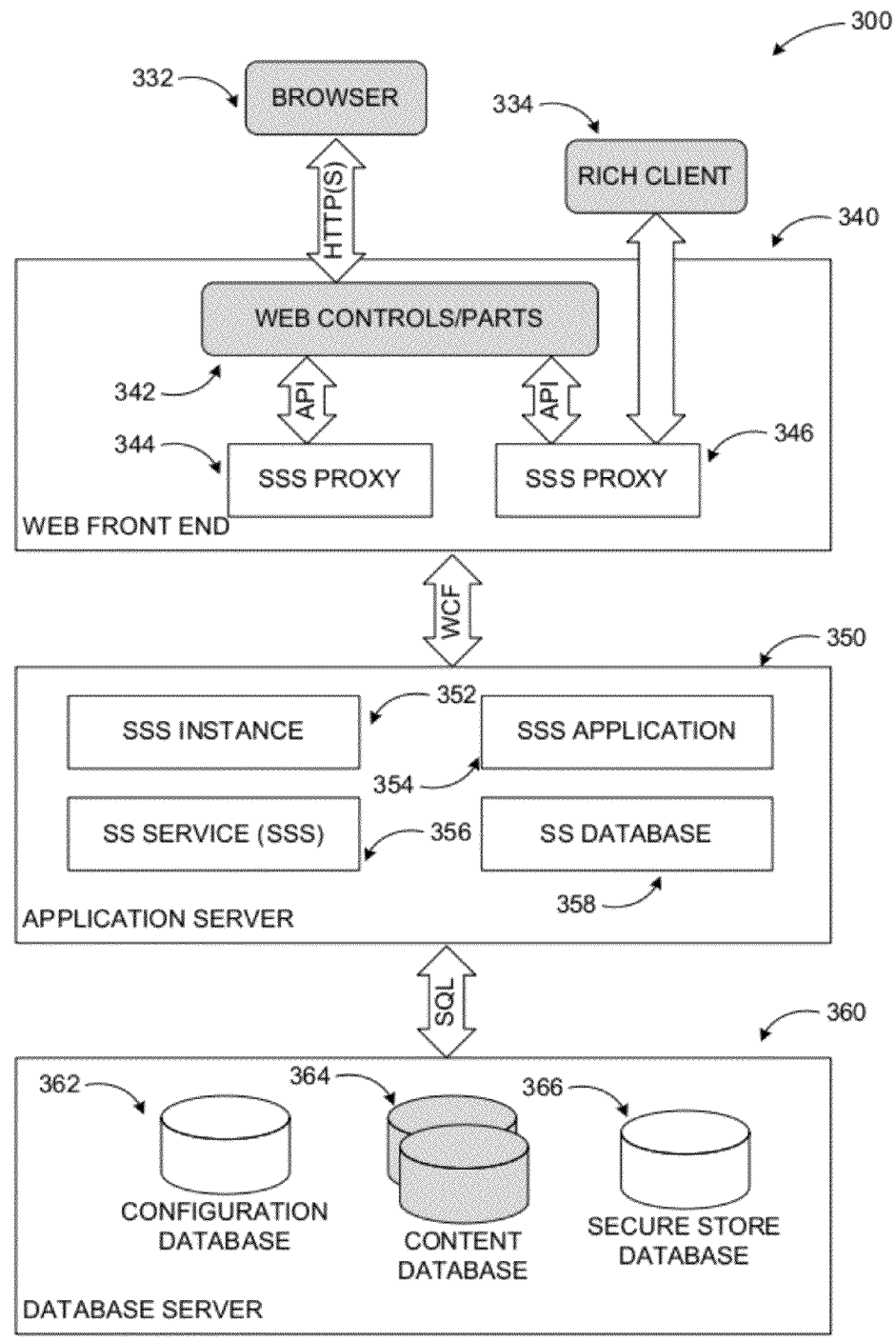
FIG. 3 is another example web based system and its components for transforming claim based identities to credentials.

FIG. 3 is another example web based system and its components for transforming claim based identities to credentials. According to some embodiments a secure store service transforming claim based identities to credential based identities may be implemented within a web service infrastructure.

Frameworks such as Windows Communication Foundation® (WCF) are designed in accordance with service oriented architecture principles to support distributed computing where services are consumed by consumers. Clients can consume multiple services and services can be consumed by multiple clients. Services typically have a standardized interface which any WCF client can use to consume the service, irrespective of which platform the service is hosted on. In diagram 300, WCF framework handles communication between components in web front end 340 and application server 350 processing token issuance in a transparent manner to the user. Service consumers such as web controls/parts 342, as well as external consumers such as rich client 334 or browser 332 (enabling a user to access service resources) communicate with the secure store service (356) through web front end 340 and not directly. Standard or custom APIs may be utilized to facilitate exchanges between web controls/parts 342 and SSS proxy 344 and/or SSS proxy 346.

SSS 356, SSS application 354, SS database 358, and SSS instance(s) 352 may reside on application server 350 accessible by web front end 340 in a shared service environment. As mentioned above communication between the components of the secure store system on application server 350 and consumers and other components on web front end 350 may be facilitated by the WCF framework.

Additionally, a database server 360 may be employed to manage a configuration database 362, a secure store database 366, and contents database(s) 364. Since the configuration database 362 may be less secure than SS database 358, master key for encrypting stored credentials may not be stored in configuration database 362. Each application server may also store the master key in its registry, which may be provided securely to a secure store administrator.

Figure 4:
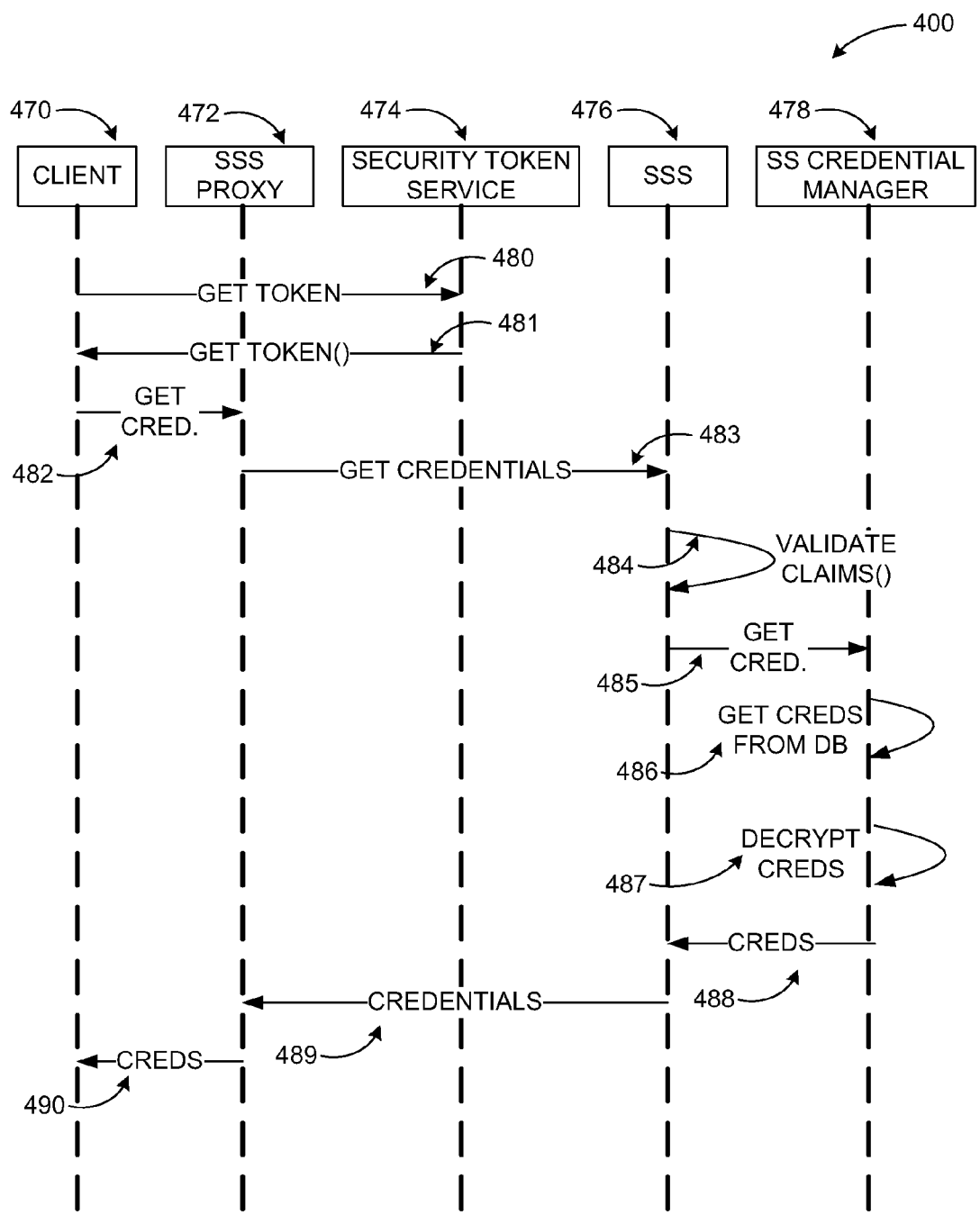
FIG. 4 is an action diagram illustrating example interactions between components of a system transforming identities according to an embodiment and a client.

FIG. 4 is an action diagram 400 illustrating example interactions between components of a system transforming identities according to an embodiment and a client for receiving credentials based on claim based identity. Diagram 400 includes interactions between client 470, SSS proxy 472, Security Token Service (STS) 474, SSS 476, and SS credential manager 478.

Interactions begin with client 470 sending a claims token request 480 to STS 474. In response, STS 474 may send the token (e.g. an SAML token) (481) to client 470. Next, client 470 requests credentials (482) through SSS proxy 472 from SSS 476. SSS 476 upon receiving the credential request 483 from SSS proxy 472 may validate claims 484 and request credentials (485) from SS credential manager 478. SS credential manager 478 retrieves credentials (486) from credentials database, where they may be stored encrypted.

To allow efficient management of the encrypted credentials using a master key while at the same time securing the key, the master key may be stored along the credentials, and for security, encrypted with trusted source provided passphrase. Encrypted master secret key may also be stored the registries of the application servers. The passphrase may be supplied by a secure store administrator after the provisioning of the service and not stored anywhere for security.

SS credential manager 478 may decrypt the credentials (487) and send the decrypted credentials (488) to SSS 476. The credentials are then provided (489 and 490) by SSS 476 to client 470 through SSS proxy 472. Client 470 may provide the credentials anytime a resource is need from the hosted service.

Secure store systems, components, and identity transformation mechanisms discussed in the figures above and below are for illustration purposes only and do not constitute a limitation on embodiments. Other embodiments using different system components, communication mechanisms, and configurations may be implemented without departing from a scope and spirit of the disclosure.

Figure 5:
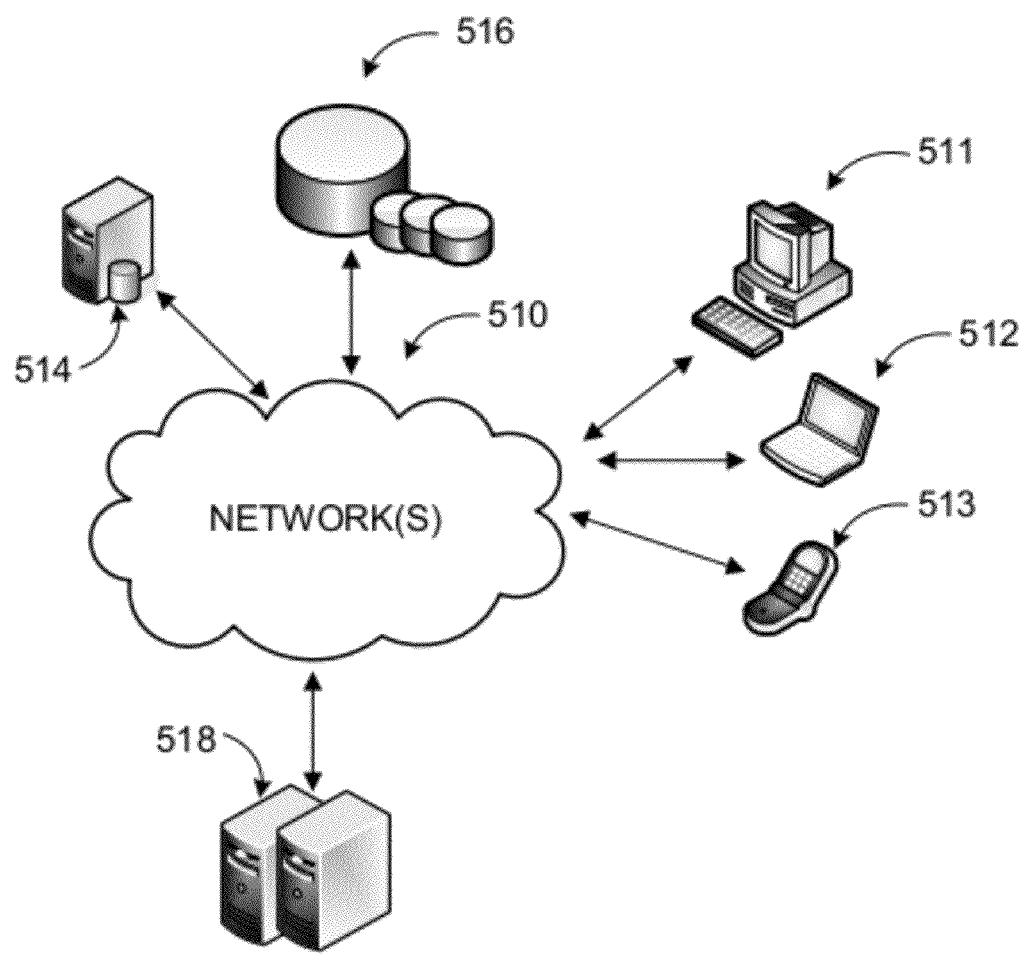
FIG. 5 is a networked environment, where embodiments may be implemented.

FIG. 5 is a networked environment, where embodiments may be implemented. A platform providing services with claim based to credential based identity transformation may be implemented via software executed over one or more servers 518 such as a hosted service. The platform may communicate with client applications on individual computing devices such as a smart phone 513, a laptop computer 512, and desktop computer 511 (client devices) through network(s) 510.

Client devices 511-513 may be used to provide access for users to a hosted service providing resources. Security for access to the resources of the hosted service may be achieved by transforming claim based identities used by a user into credentials and storing the credentials securely for use anytime the user requests access to a resource. Data associated with the credentials, encryption of the credentials, and other parameters of the system may be stored in one or more data stores (e.g. secure data store 516), which may be managed by any one of the servers 518 or by database server 514.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also coordinate communication over other networks with additional servers, client devices, and other specialized computing devices. Network(s) 510 provides communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a secure store service with identity transformation. Furthermore, the networked environments discussed in FIG. 5 are for illustration purposes only. Embodiments are not limited to the example applications, modules, or processes.

Figure 6:
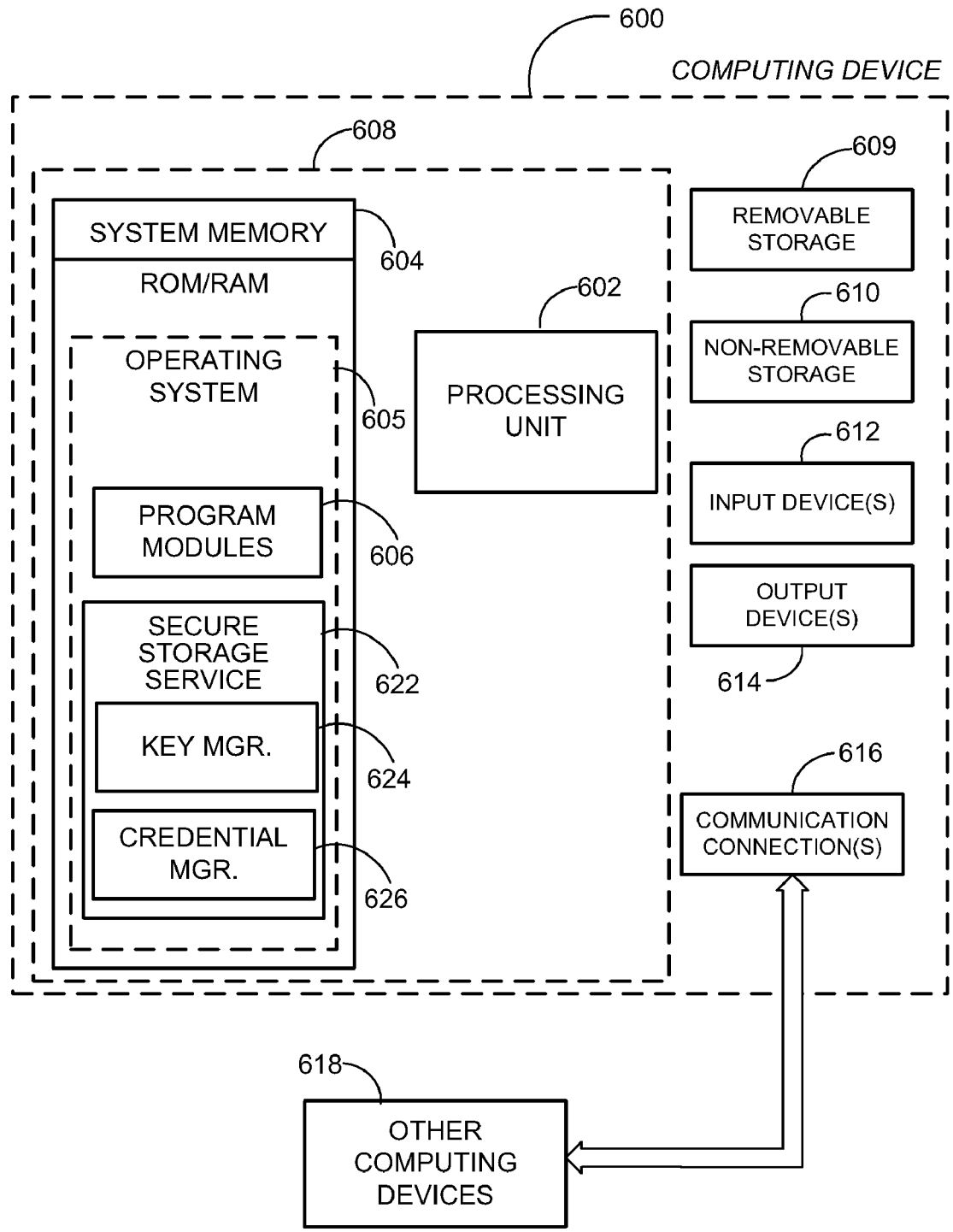
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be an application server part of system providing a hosted service and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606 and secure store service 622 with credential manager 626 and key manager 624.

Transformation of claim based identities to credentials may be performed by a distinct application within secure store service 622 or integral modules of the hosted service. Key manager 624 may manage encryption key for securely storing credentials in a secure data store. Credential manager 626 may get and set credentials for an application. Credential manager 626 may also support ticketing used in cases where a component that does the actual request for a resource does not have direct access to the credentials of the user who initiated the original request. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 606 and non-removable storage 610. Computer readable storage media may include volatile and nonvolatile, removable and non-removable media implemented in any method or technology for storage of information, such as computer readable instructions, data structures, program modules, or other data. System memory 604, removable storage 606 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication, data storage, and comparable applications associated with a hosted service providing resources. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
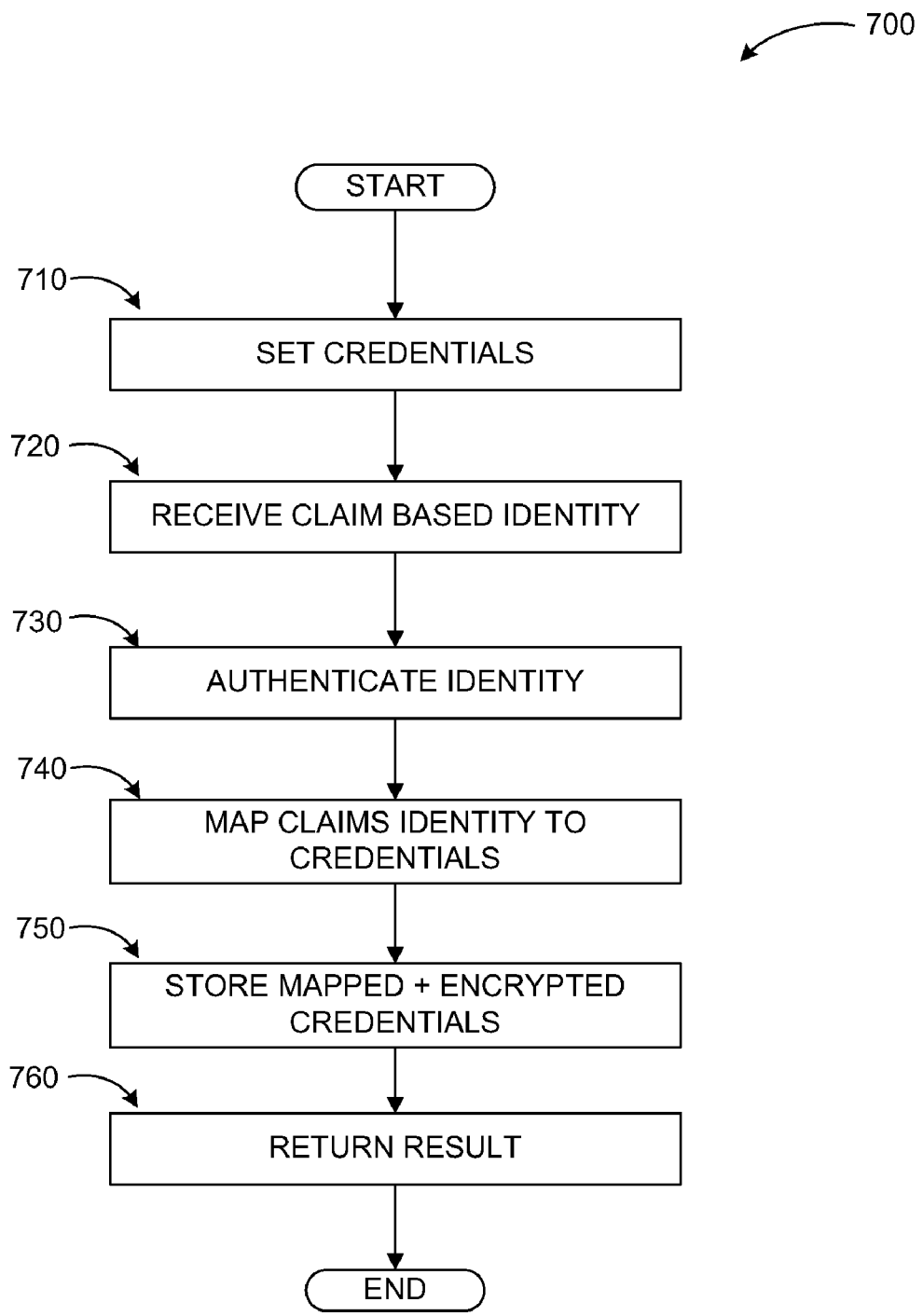
FIG. 7 illustrates logic flow diagram for setting credentials in a system transforming a claim based identity to a credential based identity according to embodiments.

FIG. 7 illustrates logic flow diagram 700 for setting credentials in a system transforming a claim based identity to a credential based identity according to embodiments. Process 700 may be implemented at an application server as part of a hosted service such as the one described above in conjunction with FIG. 2.

Process 700 begins with operation 710, where credentials are set based on input from a user or other source. At subsequent operation 720, a claim based identity is received at a trusted source such as a Secure Token Service (STS). At following operation 730, the claim based identity is authenticated and a token such as a SAML token sent to the secure store service (SSS), where the credential is mapped to a claim associated with the claim based identity as indicated on the token at operation 740. This is followed by operation 750, where the mapped credentials are stored securely (e.g. through encryption). At operation 760, a result is returned to the user confirming successful mapping and storage of the credentials.

Figure 8:
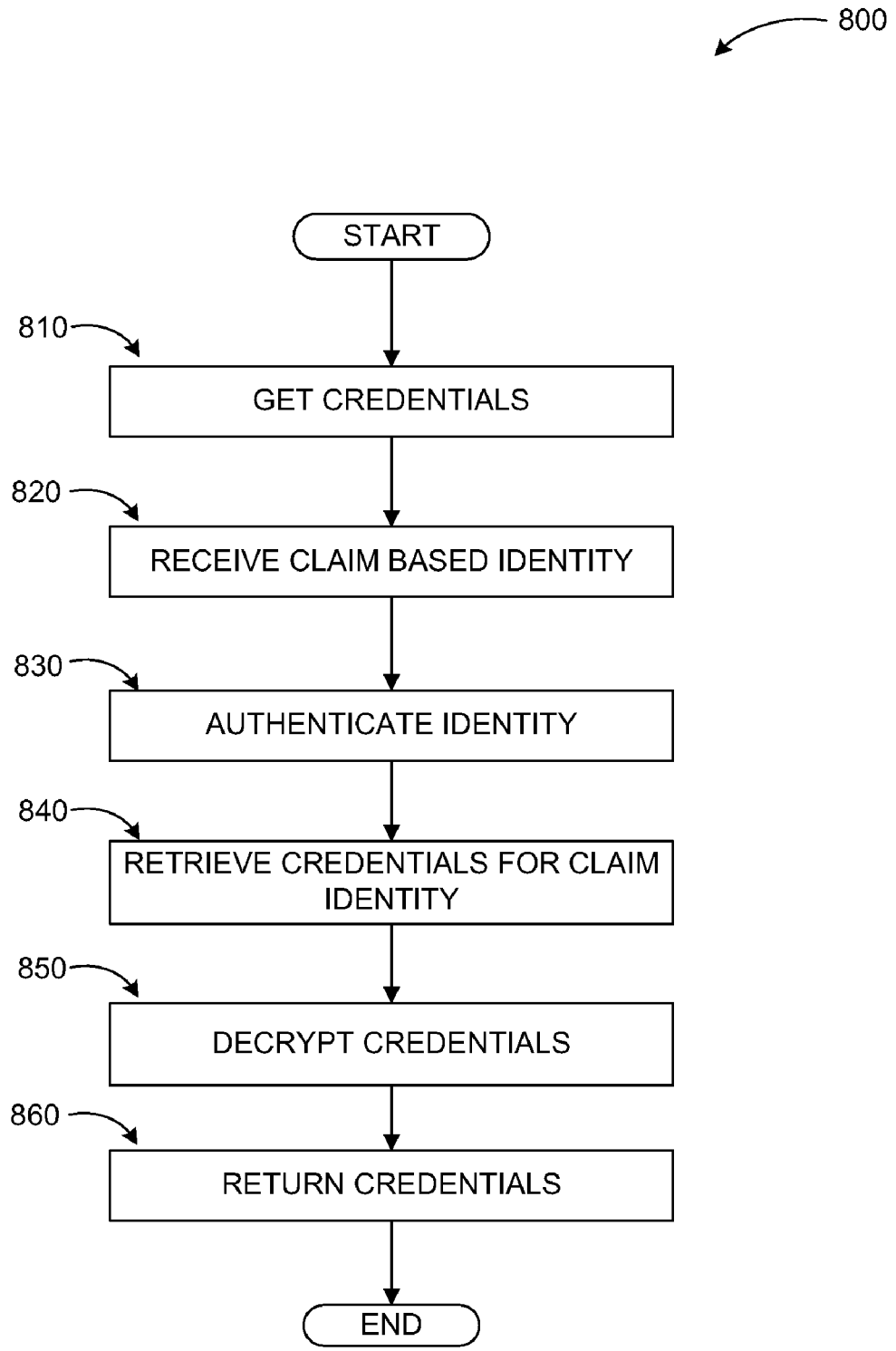
FIG. 8 illustrates logic flow diagram for getting credentials in a system transforming a claim based identity to a credential based identity according to embodiments.

FIG. 8 illustrates logic flow diagram 800 for getting credentials in a system transforming a claim based identity to a credential based identity according to embodiments. Process 800 may be implemented at the application server discussed above.

Process 800 begins with operation 810, where credentials are obtained. At operation 820, a claim based identity is received at a trusted source such as a Secure Token Service (STS). At following operation 830, the claim based identity is authenticated and a token such as a SAML token sent to the secure store service (SSS), from where one or more credentials mapped to a claim associated with the claim based identity as indicated on the token are retrieved at operation 840. This is followed by operation 850, where the retrieved credentials are decrypted. At operation 860, the decrypted credentials are returned to the user for use in authorization of the user to an access controlled resource.

The operations included in processes 700 and 800 are for illustration purposes. Transforming claim based identities to credential based identities may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device including a memory storing instructions and a processor executing an application in conjunction with the stored instructions for transforming a claim based identity to a credential based identity, the method comprising:
   receiving at a secure store service residing on an application server a claim based identity via a security token issued by a trusted authority to a client entity at a front end server through a secure store service proxy residing at the front end server;
   mapping a credential to the claim based identity;
   validating the claim at the secure store service on the application server;
   storing the credential in a secure manner in a Secure Store Database (SSD) associated with the secure store service;
   encrypting on the application server the credential stored in the secure store database associated with the secure store service utilizing a master key generated and managed by a key manager;
   synchronizing the master key to a new service instance at the key manager;
   in response to receiving the security token for each request to access a resource associated with the secure store service, retrieving the credential from a secure store database;
   employing a credential manager for decrypting the retrieved credential on the application server;
   returning the decrypted credential to the client entity of the request for use in authorization of the client entity to an access controlled resource;
   backing up and restoring the SSD at the key manager; and
   enabling a user and an administrator to at least one from a set of: create, read, and delete an application employing an application management API declared by an application manager.

2. The method of claim 1, wherein a trust between the trusted authority and the secure store service is established.

3. The method of claim 1, wherein issuance of the security token is transparent to the user and handled by a collaborative service, wherein the collaborative service is a security token service (STS).

4. The method of claim 3, further comprising:
   employing Secure Socket Layer (SSL) protocol to secure the credential between the secure store service and the security token service.

5. The method of claim 1, wherein the security token is a Security Assertions Markup Language (SAML) token.

6. The method of claim 1, wherein the credential is created based on a Single Sign-On (SSO) claim based identity without relying on dependencies of underlying SSO architecture.

7. The method of claim 1, wherein storing the credential based on the security token includes encrypting the credential stored in the secure store database associated with the secure store service employing the master key.

8. The method of claim 7, further comprising:
   synchronizing the master key to each new secure store service instance at the key manager; and
   synchronizing the master key to a change in a secure store service account associated with the user.

9. The method of claim 7, wherein the master key is generated after the secure store service is provisioned.

10. A computer-readable memory device with instructions stored thereon for transforming a claim based identity to a credential based identity, the instructions comprising:
    receiving a claim at a Secure Token Service (STS);
    providing a security token upon authenticating the claim;
    receiving at a secure store service (SSS) residing on an application server a claim based identity via the security token issued by a trusted authority to a client entity at a front end server through a SSS proxy residing at the front end server, wherein the a trust relationship between the SSS and the STS has been established;
    authenticating the claim based identity;
    requesting a credential from a credential manager through the SSS proxy;
    retrieving the requested credential form the credential manager;
    upon receiving the credential request, validating the claim;
    mapping the credential to the claim based on the security token;
    encrypting the credential stored in the secure store database associated with the SSS using a master key generated and managed by a key manager and stored in a registry associated with the application server;
    synchronizing the master key to a new service instance at the key manager;
    modifying a master secret key at the key manager and storing the master secret key at the registry associated with the application server, wherein the master secret key includes the master key and the credential encrypted with a trusted source provided pass phrase;
    storing the encrypted credential in a secure manner in a Secure Store Database (SSD) associated with the SSS for use in authorization of subsequent requests for access by a user associated with the claim through providing the credential mapped to the claim;
    decrypting the encrypted credential at the credential manager;
    receiving the decrypted credential form the credential manager at the SSS;
    providing the decrypted credential from the SSS to the client entity through the SSS proxy;
    backing up and restoring the SSD by the key manager; and
    enabling one of the user and an administrator to at least one from a set of: create, read, and delete an application employing an application management API declared by an application manager.

11. The computer-readable memory device of claim 10, wherein a plurality of credentials are mapped and stored based on the claim to provide to the user for authentication to a plurality of applications.

12. The computer-readable memory device of claim 10, wherein the master key is further utilized to at least one of: backing up and restoring the secure store database containing the credential.

13. The computer-readable memory device of claim 10, wherein the pass phrase is provided by an SSS administrator and not stored within a system associated with the SSS.

14. A system for transforming a claim based identity to a credential based identity, the system comprising:
    a web server including a memory and a processor coupled to the memory, the processor configured to execute:
        a Security Token Service (STS) executed on a web server for receiving a request for a security token from a client application and providing the security token to the client application upon authentication of a user associated with the claim, wherein the security token is a Security Assertions Markup Language (SAML) token;
        a first Secure Store Service (SSS) proxy for handling requests from rich clients and web browser clients;
        a second SSS proxy for handling requests from web browser clients only;
    an application server including a memory and a processor coupled to the memory, the processor configured to execute a Secure Store Service (SSS) that includes:
        an SSS application for:
            validating the claim;
            authenticating the claim based identity;
            mapping credentials to the claim based on a received security token, wherein the credentials are created based on a Single Sign-On (SSO) claim based identity without relying on dependencies of underlying SSO architecture;
            in response to receiving a request for access to a resource, searching for stored credentials in a secure store database associated with the SSS corresponding to the security token associated with a user submitting the request and providing the stored credentials to the user through one of the first SSS proxy and second SSS proxy;
        a credential manager for:
            receiving and associating the credentials mapped to the claim with applications from the secure store database; and
            encrypting and decrypting the credentials stored in the secure store database and upon request by the SSS, sending the decrypted credentials to the SSS;
        a key manager for:
            encrypting the credentials for storing in the secure store database associated with the SSS using a master key;
            encrypting the master key using an administrator provided pass phrase as a master secret key, wherein the master secret key is stored along with the encrypted credentials in a registry associated with the application server;
            synchronizing the master key to a new service instance at the key manager;
            modifying the master secret key at the key manager and storing the master secret key at the registry associated with the application server;
            backing up and restoring the secure store database; and
        the secure store database for storing the encrypted credentials and the master key, wherein the secure store database is hosted on a database server and managed by the application server.

15. The system of claim 14, wherein the credential manager is further configured to:
    support ticketing for requests where a submitter of the requests and an authorized user associated with the request are distinct.

16. The system of claim 14, wherein the SSS further includes:
    an application manager for:
    enabling a user to at least one from a set of: create, read, and delete an application.

17. The system of claim 14, wherein the SSS is part of a hosted service providing a plurality of resources to authorized users.

18. The system of claim 17, wherein the plurality of resources includes at least one from a set of: access to data, access to printing resources, access to storage resources, access to computation resources, and access to communication resources.

* * * * *